Feb. 23, 1932.  J. B. BASKERVILLE  1,846,985
IMPACT RECORDER
Filed Sept. 29, 1930    3 Sheets-Sheet 1
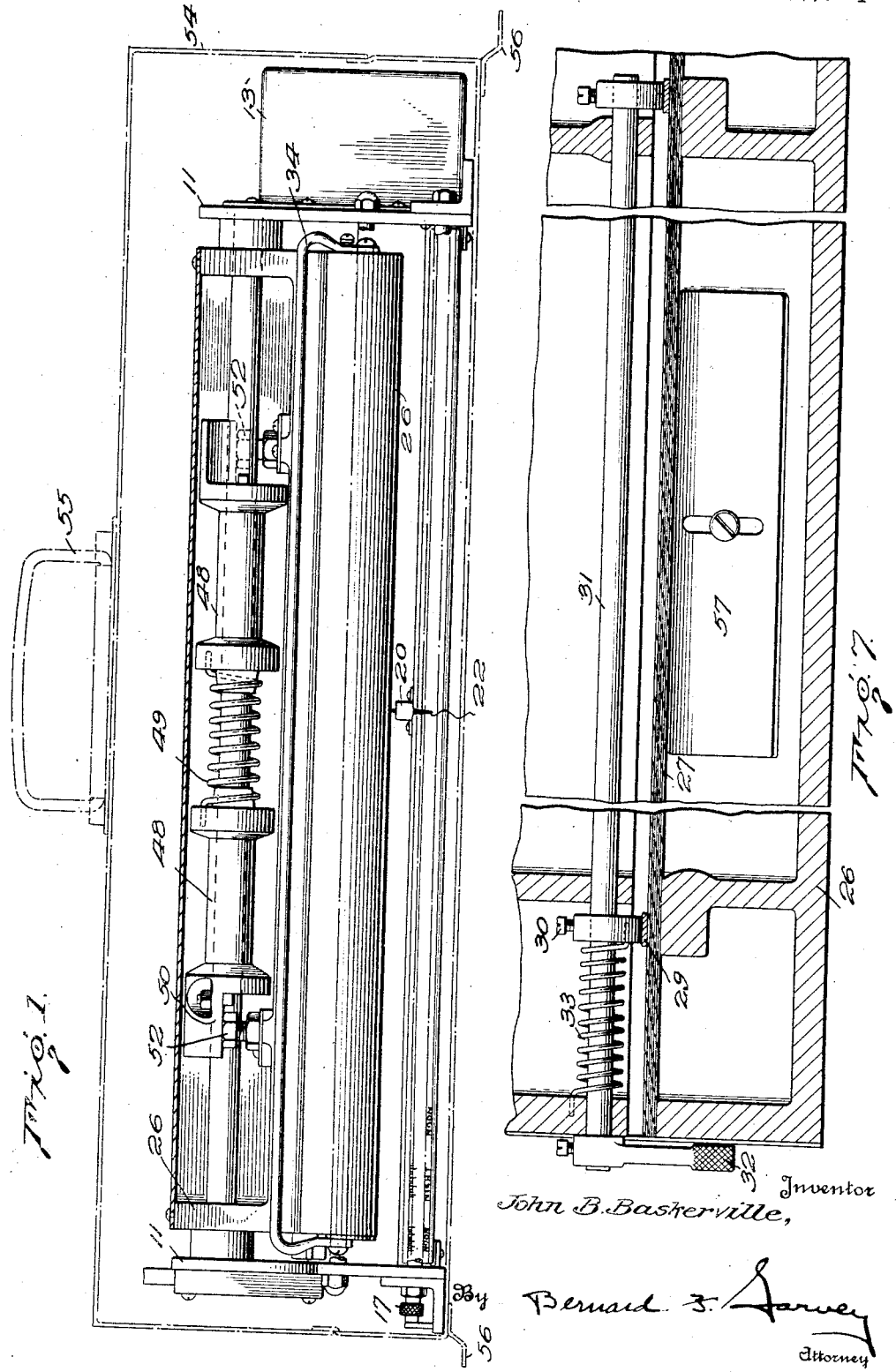
Inventor
John B. Baskerville,
By Bernard F. Garvey
Attorney Feb. 23, 1932.    J. B. BASKERVILLE    1,846,985
IMPACT RECORDER
Filed Sept. 29, 1930    3 Sheets-Sheet 2
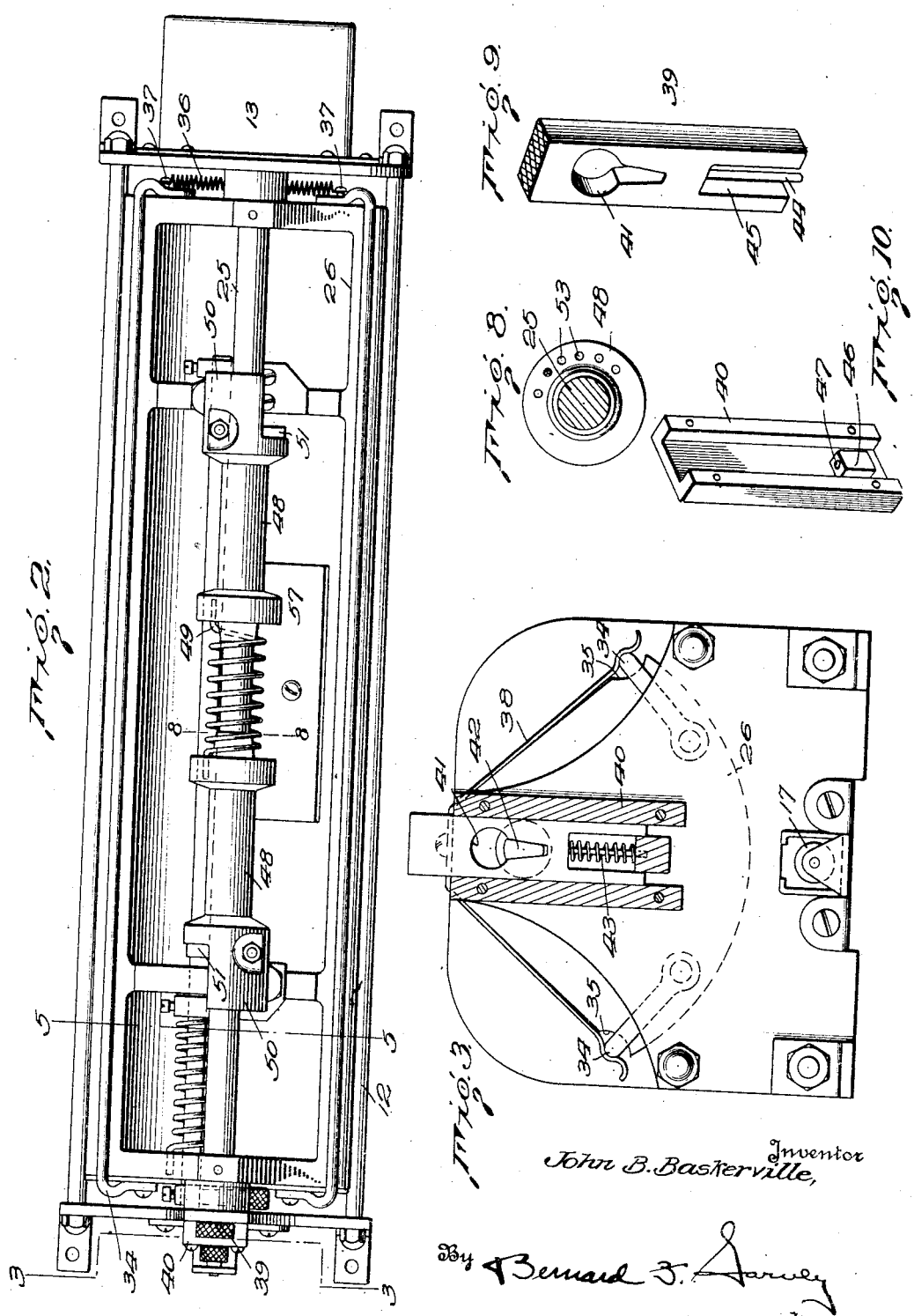

Feb. 23, 1932.   J. B. BASKERVILLE   1,846,985
IMPACT RECORDER
Filed Sept. 29, 1930   3 Sheets-Sheet 3

Inventor
John B. Baskerville,
By Bernard F. Harvey
Attorney

Patented Feb. 23, 1932

1,846,985

UNITED STATES PATENT OFFICE

JOHN B. BASKERVILLE, OF ROANOKE, VIRGINIA, ASSIGNOR TO THE IMPACTOGRAPH CORPORATION, OF ROANOKE, VIRGINIA, A CORPORATION OF VIRGINIA

IMPACT RECORDER

Application filed September 29, 1930. Serial No. 485,210.

The present invention consists of an impact recorder and is designed as an improvement over my prior patents, No. 1,577,160, granted March 16, 1926; No. 1,692,611, granted November 20, 1928; No. 1,698,576, granted January 8, 1929; and, No. 1,745,522, granted February 4, 1930. In the present invention the operative principle remains substantially the same as that covered in my previous patents, namely, to record excessive impacts sustained by rolling stock in transit.

An object of this invention is to provide improved record sheet platen control mechanism to effect more accurate control of the platen without curtailing or mitigating its efficiency, at the same time providing a more durable structure which is subjected to a minimum amount of wear.

Another object of the invention is to provide locking means for the platen, which prevents movement of the latter, when the platen is in an operative position, beyond the record recording zone of the platen, the platen locking means being operable to retain the latter in an inoperative position to thereby permit facile application of the record sheet to the platen.

A further object of the invention is to provide novel record sheet retaining mechanism which is carried by the platen and which is operable by common means to embrace an intermediate part of the record sheet, as well as the margins thereof, and positively prevent casual displacement of the record sheet on the platen.

A still further object of the invention is to provide an improved stylus which is of very simple construction and is mounted to positively operate under all conditions and requires no adjustment; also, which is not disengaged or displaced even under severe impacts.

Other objects of the invention will be apparent from the following description of the present preferred form of the device, taken in connection with the accompanying drawings, wherein Fig. 1 is a front elevational view of an impact recorder, constructed in accordance with the present invention;

Fig. 2 is a top plan view thereof, showing the case removed;

Fig. 3 is a transverse sectional view, taken on the line 3—3 of Fig. 2;

Fig. 7 is a detail fragmentary longitudinal sectional view, taken on the line 7—7 of Fig. 5;

Fig. 8 is a detail transverse sectional view, taken through the platen shaft on the line 8—8 of Fig. 2;

Fig. 9 is a detail perspective view of the platen shaft locking block or key; and, Fig. 10 is a similar view of the block housing.

Figure 5:
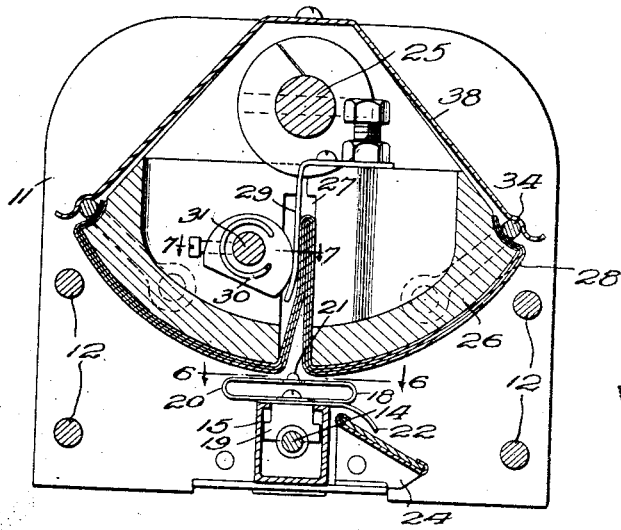
Fig. 5 is a transverse sectional view taken on the line 5—5 of Fig. 2.

The device of the present invention embodies a pair of end plates 11, which are held in detachable engagement through the medium of parallelly arranged rods 12, which are preferably engaged through the plate near the bottom of the latter and adjacent the margins thereof, as shown to advantage in Fig. 5. One of the plates 11 has clock mechanism 13 engaged therewith, this mechanism being operatively connected to a screw shaft 14 mounted in the bottom of the plates 11 and housed in a track 15. The ends of the track are engaged with the plates 11 and are secured thereto in any desired manner. The clock operated shaft 14 has the free end thereof extended beyond one of the plates 11 and journaled in a bracket 16, which extends upwardly from beneath the track 15. A knurled nut 17 is engaged with the shaft 14, through the medium of which the stylus, hereinafter described, may be returned to its starting point, adjacent the clock mechanism, after having been operated along the shaft 15 during travel of the rolling stock.

Slidably mounted in the track 15 is a stylus, generally designated 18, which comprises a block 19 slidably mounted in the track and equipped with screw threads complementing the shaft 14, so that when the block 19 is engaged in the track 15 and with the shaft 14, rotation of the latter correspondingly imparts longitudinal movement to the block. The stylus per se, designated 20, is detachably secured to the block 19 and in the present instance consists of a metallic strap folded into a band, to provide resiliency and equipped, midway the ends of the upper run of the band, with a finger 21, the latter being struck up from the strap, as shown to advantage in Fig. 5. The stylus 20 is superimposed on an indicating digit 22, which bends downwardly and overhangs a graduated bar or plate 23 mounted on a suitable support 24 and arranged in proximity to the front of the track 14. Preferably the graduated bar 23 is disposed at an inclination so that it may be conveniently read in a manner hereinafter set forth. The bar may be graduated in any desired manner, but preferably the indicia thereon is representative of the hours of the day, and may also include such indicia as noon and night, to differentiate between twelve o'clock noon and twelve o'clock midnight, in a manifest manner.

The upper ends of the plates 11 have a platen shaft 25 rotatably mounted therein, a platen 26 being rotatably mounted on the shaft. The platen in the present instance is shown to consist of a segment of a circle, which is provided with a slot 27 extending through the longitudinal center of the platen from one end thereof to the other. The platen 26 is adapted for the reception of a record sheet 28 which, when mounted in place on the platen, is adapted to be impinged by the finger 21 of the stylus 20 when the platen oscillates. In order to prevent disengagement or displacement of the record sheet from the platen 26, I prefer to engage an intermediate part of the record sheet in the slot 27 and to secure the latter therein by spring fingers 29, which are urged against the record sheet to force the latter over against one wall of the slot by means of eccentrics 30, the eccentrics being yieldingly mounted on a rod 31. The rod 31 extends longitudinally through a portion of the platen, as shown advantageously in Figs. 5 and 7 and has one end thereof projected beyond one end of the platen and engaged by a finger operated lever 32. The lever 32 is detachably engaged with the rod 31 and is adapted to operate against the resistance of a spring 33, carried by the rod 31. When the eccentrics 30 are to be disengaged from the finger 29, one end of the spring 33 is anchored in one of the eccentrics 30, while the opposite end of the spring is anchored to the platen 26. Consequently, the eccentrics 30 are normally urged by the spring 33 into engagement with the fingers 29 to flex the latter against the record sheet 28. When it is desired to release the record sheet, pressure is exerted on the finger release lever 32, which retracts the eccentrics 30 and permits the fingers 29 to flex away from the record sheet in a manifest manner. The fingers 29 are detachably carried by the platen 26, as illustrated to advantage in Fig. 5.

Figure 4:
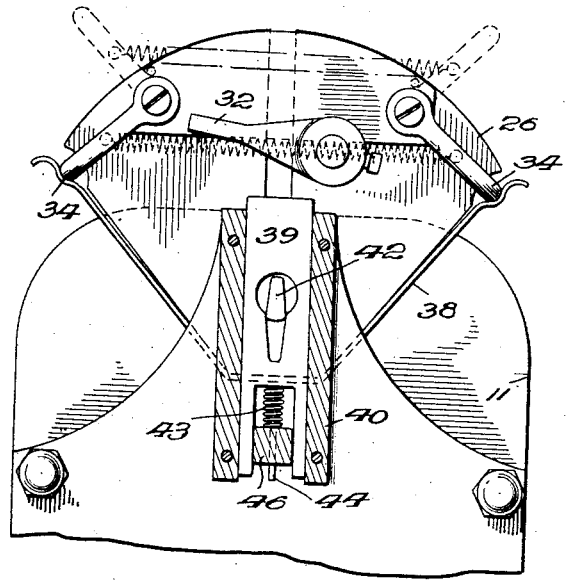
Fig. 4 is a detail fragmentary transverse sectional view of the recorder, showing the platen in an inoperative position.
Figure 6:
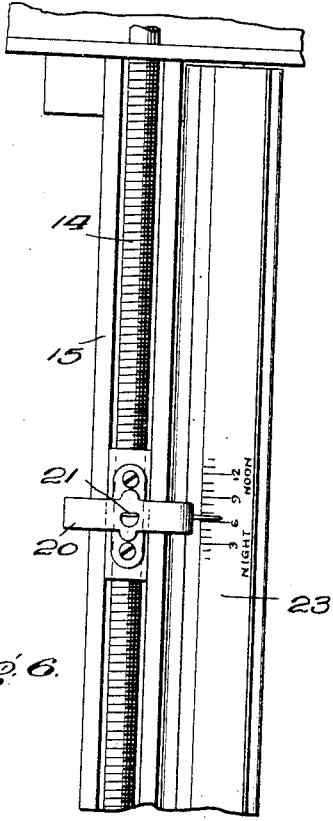
Fig. 6 is a fragmentary longitudinal sectional view, taken on the line 6—6 of Fig. 5, looking in the direction of the arrow.

The record sheet is adapted to be held flat against the outer face of the platen 26 and to effect this result I prefer to employ a pair of retaining bars 34, one being pivotally engaged on each side of the platen and adapted to urge the lateral marginal edges of the record sheet into longitudinally extending recesses 35. The retaining bars 34 are held in engagement with the record sheet by a spring 36, the opposite ends of which are engaged with pins 37, carried by the bars 34 at one end of the latter. The bars 34 are further held from displacement by the free ends of a hood 38, which is secured to the top of the platen and extends downwardly over the latter, as advantageously illustrated in Figs. 3, 4 and 5.

As above described, platen shaft 25 is rotatably mounted in the end plates 11 and the platen 26 is rotatably mounted on the shaft 25. Suitable means is provided to normally hold the shaft 25 fixed against rotation and further means is provided to normally hold the platen from oscillating on the shaft. The means employed in the present invention for normally holding the shaft 25 from displacement is a key block 39, slidably mounted in a complemental housing 40, which is mounted on one of the end plates 11. The key block, as shown to advantage in Fig. 9, is provided with a bayonet slot 41, which is adapted for engagement with the reduced flattened end 42 of the shaft. It is apparent that the reduced flattened end 42 of the shaft 25 may be freely engaged through the enlarged portion of the bayonet slot 41 and the key block 39 urged upwardly in the housing 40, so as to bring the reduced end of the bayonet slot into a wedge fit with the flattened end 42 of the platen shaft. In order to urge the key block 39 upwardly in the housing 40, I have in the present instance, provided a spring 43, which is adapted to be convoluted about a pin 44, said pin depending in a slot 45 formed in the block 39. One end of the spring 43 bears against the inner wall of the slot, while the opposite end of the spring is adapted to engage an abutment 46, carried by the inner wall of the housing 40, the latter being provided with an opening 47 which receives the lower end of the pin 44. By projecting the upper end of the key block 39 above the housing 40, the key block is made accessible, so that pressure can be brought to bear thereon to urge the block downwardly to a point where the flattened end 42 of the platen shaft is located in the enlarged end of the bayonet slot 41, in which position the platen shaft 25 is free to rotate.

The means employed to dampen the oscillations of the platen in the present instance consists of a pair of spools 48 which are sleeved on the shaft 25 and have their proximate ends engaged by a coil spring 49. The outer end of each spool 48 is equipped with a segmental extension 50, the lateral margins of which are adapted for engagement with a key 51, which extends transversely through the shaft 25 in the path of the extended segment 50. The segments 50 of the two spools are out of longitudinal alignment, so that the margin of one segment will be engaged with an end of one of the keys, while the other margin of the opposite segment is engaged with the opposite end of the other key. In this way the platen is held from displacement unless the force applied thereto is sufficient to overcome the resistance of the spring 49, in which instance the platen may be moved in either direction, only, however, about 90°, since continued movement of the platen causes one of the spools to be moved to a point where the segment 50 thereof is in longitudinal alignment with the segment of the other spool in which position both segments come in contact with their respective keys 51, at the same side, thereby preventing further movement of the platen, unless the shaft 25 is released by the key block 39. In order to permit adjustment of the extent of movement of the platen 26, I provide a pair of bolts 52, one of which is adjustably mounted in the platen at each side of the longitudinal axis of the shaft 25, below the segments 50. Consequently, the throw of the platen may be increased or diminished by adjusting the bolts 52 in an obvious manner. It will also be noted from Fig. 8 of the drawings that the tension of the spring 49 may be adjusted by changing the positions of the free ends of the spring in openings 53, which are formed in the inner ends of the spools 48.

Preferably the impact recorder is mounted in a case or holder 54, shown in the present instance, to be of oblong configuration, the body thereof being of sufficient size to compactly accommodate the impact recorder, as shown in Fig. 1 of the drawings. The cover of the case fits over the top of the impact recorder and is adapted to be locked to the body of the case in a manifest manner. The case may be equipped with a handle 55, if desired, for convenience in carrying the same. Furthermore, the case is preferably provided with plates 56 which are adapted for slidable engagement beneath complemental plates on the floor of a freight car or other movable body in which the impact recorder is mounted.

Since this device is especially adapted for use on railway rolling stock, its use as applied to a railway car will be hereinafter described. Before placing the impact recorder in a car, it is of course essential to engage the record sheet with the platen. This is effected by releasing the shaft 25 through the medium of the key block 39, so that the platen may be swung into the position shown in Fig. 4 of the drawings. When in this position the record sheet may be engaged with the platen in the manner already described and the platen then permitted to be swung downwardly into its normal position by again releasing the block 39. It is to be understood that the block 39 is used to lock the shaft from movement when the platen is in an inoperative position, as well as when the platen is in an operative position. Consequently, the platen cannot be casually thrown from one position to the other. The stylus 20 is usually set at approximately the starting time of the train, at one end of the shaft 14, by rotation of the shaft 14 through the medium of the knurled nut 17. As shown to advantage in Fig. 5 of the drawings, the finger 21 of the stylus will normally lie in the longitudinal slot of the platen and will not impinge against the record sheet 28 until the platen has moved an appreciable distance in either direction. When the platen does move an appreciable distance, the impingement of the finger 21 with the record sheet causes a mark to be made on the latter. In view of the platen control means herein employed, which has been described above, it is impossible for the platen to move beyond the outer extremity of the record sheet. The length of the mark on the record sheet indicates the severity of the impact sustained by the recorder. In the present invention the ordinary vibration and jar of rolling stock incident to normal travel makes no impression on the record sheet. As soon, however, as abnormal impacts are sustained, either due to acceleration or deceleration of the train, or by inaccuracies in the road of travel, or by accidents, or from any other source, these impacts will be translated to the recorder and a record made thereof on the record sheet. Since the stylus is constantly moved by the clock mechanism 13, it is apparent that a comparison of the record sheet with the graduated bar 23 will indicate the exact day and time of the day when an impact was sustained. At the end of a trip the recorder is removed from the car and the record sheet taken from the platen. These are filed for reference. A record sheet may again be mounted in the impact recorder, the clock wound, and the recorder again mounted in a car. The plate 57 is a counterbalance adjustably mounted in the platen 26, to obtain accurate balance of the pendulum.

It is of course to be understood that various changes may be made in the details of construction, proportion and arrangement of parts, within the scope of the appended claims.

What is claimed is:—

1. An impact recorder including a movable record sheet carrying platen, a stylus engageable with the record sheet when the platen moves a predetermined distance, and locking means to prevent movement of the platen beyond the margins of the record sheet.

2. An impact recorder including a movable record sheet carrying platen, a stylus engageable with the record sheet when the platen moves a predetermined distance, locking means to prevent movement of the platen beyond the margins of the record sheet, means to release said locking means to permit movement of the platen into an inoperative position, said locking means being automatically operable to prevent return of the platen to an operative position until the release means is operated.

3. An impact recorder including a record sheet carrying platen, provided with a longitudinally extending slot adapted for the reception of an intermediate part of the record sheet, a stylus for engagement with the record sheet during movement of the platen, and means mounted in the platen to yieldingly engage the intermediate part of the record sheet and prevent displacement thereof.

4. An impact recorder including a movable record sheet carrying platen, a stylus for engagement with the record sheet when the platen is displaced, means engaged with the platen to normally hold the latter in a fixed position, said means being displaceable when the platen is subjected to impacts.

5. An impact recorder including a movable record sheet carrying platen, means to lock said platen against movement beyond predetermined limits, means for releasing said platen to permit movement of the same into an inoperative position, said locking means preventing movement of the platen beyond predetermined limits when in an inoperative position, said releasing means being operable to permit movement of the platen beyond said predetermined limits, and a stylus to engage the record sheet when the platen moves while in an operative position.

6. An impact recorder including a movable record sheet carrying platen, a stylus for engagement with the record sheet when the platen is displaced, means to confine movement of the platen to the lateral extent thereof, and secondary means for rendering the first said means inert to permit movement of the platen beyond the lateral extent thereof.

7. In an impact recorder including a record sheet carrying platen with a stylus cooperable therewith, means to secure the record sheet on the platen, including eccentrics yieldingly engageable with an intermediate part of the record sheet.

8. An impact recorder including a record sheet carrying platen, a stylus to engage the record sheet when the platen moves a predetermined extent, said stylus comprising a yieldable band with a finger stuck out therefrom and arranged to lie in the path of movement of the record sheet.

9. An impact recorder including a record sheet carrying platen, a stylus mounted to impinge against the record sheet, bars engageable with the record sheet to secure the margins thereof to the platen, and a hood mounted on the platen and having the free margins thereof flexed over said bars to prevent casual displacement of the latter.

JOHN B. BASKERVILLE.